United States Patent
Al-Shaikh et al.

(10) Patent No.: US 10,395,449 B2
(45) Date of Patent: *Aug. 27, 2019

(54) MOBILE DEVICE ATTENDANCE VERIFICATION WITH PERSONAL IDENTIFIER

(71) Applicants: Saudi Arabian Oil Company, Dhahran (SA); King Fahd University of Petroleum and Minerals, Dhahran (SA)

(72) Inventors: Raed Abdullah Al-Shaikh, Dhahran (SA); Sadiq M. Sait, Dhahran (SA); Muyeed Ahmed Shariff, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,429

(22) Filed: Feb. 11, 2019

(65) Prior Publication Data

US 2019/0188931 A1    Jun. 20, 2019

Related U.S. Application Data

(63) Continuation of application No. 15/830,356, filed on Dec. 4, 2017.

(51) Int. Cl.
*G06F 17/00* (2019.01)
*G07C 9/00* (2006.01)
(Continued)

(52) U.S. Cl.
CPC ........... *G07C 9/00* (2013.01); *G06K 9/00006* (2013.01); *G06K 9/00087* (2013.01); *H04W 4/02* (2013.01)

(58) Field of Classification Search
CPC .. G07C 9/00; G06K 9/10006; G06K 9/00087; H04W 4/02
(Continued)

(56) References Cited

U.S. PATENT DOCUMENTS 7,004,389 B1   2/2006   Robinson et al.
8,294,549 B2   10/2012  Samovar et al.
(Continued)

FOREIGN PATENT DOCUMENTS

WO    2009013526 A1    1/2009
WO    2017015260 A1    1/2017

OTHER PUBLICATIONS

Easy Clocking "Mobile Time & Attendance Solutions: Easily manage employees on the go" Accessible as of Aug. 28, 2017 at the website: https://easyclocking.com/mobile/html; 12 pages.
(Continued)

*Primary Examiner* — Karl D Frech
(74) *Attorney, Agent, or Firm* — Bracewell LLP; Constance G. Rhebergen; Christopher L. Drymalla

(57) ABSTRACT

Provided are systems and methods of attendance verification using mobile electronic devices (or "mobile devices"). In some embodiments, a person's biometric data is acquired and verified locally by a mobile device associated with the person while the mobile device is located in a geographic region associated with an event, and attendance data, including an indication of the verification of the biometric data along with a unique identifier of the mobile device, such as an international mobile equipment identity (IMEI) of the mobile device, is transmitted to an attendance server that makes a record of the person's attendance of the event based on the attendance data.

19 Claims, 6 Drawing Sheets

(51) Int. Cl.
*G06K 9/00* (2006.01)
*H04W 4/02* (2018.01)

(58) Field of Classification Search
USPC .............................. 235/375, 379, 380, 385
See application file for complete search history.

(56) References Cited

U.S. PATENT DOCUMENTS

| | | |
|---|---|---|
| 9,699,651 B2 | 7/2017 | Ljung |
| 2013/0268418 A1 | 10/2013 | Sardi et al. |
| 2014/0354402 A1 | 12/2014 | Joao |
| 2015/0014412 A1 | 1/2015 | Sulavik et al. |
| 2015/0310566 A1 | 10/2015 | Smyth |
| 2015/0373147 A1 | 12/2015 | Stuntebeck et al. |
| 2016/0065558 A1 | 3/2016 | Suresh et al. |
| 2016/0337136 A1 | 11/2016 | Bester |
| 2017/0245146 A1 | 8/2017 | Rolfe |

OTHER PUBLICATIONS

Mayan, Albert J., et al.; "GPS Enabled Employee Registration and Attendance Tracking System" 2015 International Conference on Control, Instrumentation, Communication and Computational Technologies (ICCICCT); pp. 62-65.

NCheck Bio Attendance Face finger Irish Biometric employee attendance management system; Accessible as of Aug. 28, 2017 at the website: http://www.ncheck.net; 5 pages.

Patil, Pratima, et al.; "A Wireless Fingerprint Attendance System" International Journal of Security, Privacy and Trust Management (IJSPTM) vol. 5, No. 4, Nov. 2016; pp. 11-17.

Rajasekar, L., et al.; "Wireless Fingerprint Attendance System using ZigBee Technology" International Journal of Power Control Signal and Computation (IJPCSC) vol. 3 No. 1, Jan.-Mar. 2012; pp. 118-121.

Uddin, Mohammad Salah, et al.; "A Location Based Time and Attendance System" International Journal of Computer Theory and Engineering, vol. 6, No. 1, Feb. 2014; pp. 36-38.

Yongqiang, Zhang, et al.; "The Design of Wireless Fingerprint Attendance System" 2006 International Conference on Communication Technology; 4 pages.

International Search Report and Written Opinion for International PCT application PCT/US2018/063715 (SA5812) dated Mar. 28, 2019; pp. 1-17.

Makhtar et al., "Implementation of Mobile Attendance Application Using Geo-Fence Technique", ARPN Journal of Engineering and Applied Sciences, 2016, pp. 3391-3395, vol. 11, No. 5, ARPN.

MOBILE DEVICE ATTENDANCE VERIFICATION WITH PERSONAL IDENTIFIER

RELATED APPLICATIONS

This application is a continuation of U.S. patent application Ser. No. 15/830,356 filed Dec. 4, 2017, which is hereby incorporated by reference.

FIELD

Embodiments relate generally to attendance verification and more particularly to attendance verification employing mobile electronic devices.

BACKGROUND

It is often desirable to verify person's attendance at a given event, such as an instructional course or a work shift. Attendance verification can be used to determine whether a person has complied with attendance requirements at these types of events. For example, in the context of an instructional course, attendance verification can be used to verify that a person attended the course and should receive credit for attending the course. In the context of a workplace, attendance verification can be used to verify that an employee was present for their work shift and should receive pay for the time worked. Attendance verification has been accomplished in various manner. For example, in an instructional course setting, such as in a classroom or at a seminar, an instructor may take attendance verbally or attendees may sign a "sign-in" sheet to indicate their attendance. In a workplace setting, a worksite may have an on-site terminal located in a fixed position within the worksite that employees physically approach to check-in when they arrive to work or check-out when they leave work, sometime referred to as clocking-in and clocking-out.

SUMMARY

Applicants have recognized that traditional attendance verification system suffer from various shortcomings. In some instances, traditional attendance verification systems are easily defeated. For example, in the context of a workplace having an on-site terminal, an employee may arrive at a worksite and use a terminal to check-in at the beginning of a shift, leave the worksite during the shift, and return to the worksite and use the terminal to check-out at the end of the shift, making it appear as though the employee was present for the entire shift. In the context of an instructional course having a sign-in sheet, a person may simply sign the name of another person that is not present, making it appear as though the other person attended the course.

As biometric screening devices have evolved, certain attendance systems rely on biometrics to confirm attendance. For example, some attendance systems employ a biometric attendance terminal having a finger-print scanner that requires a person to submit their finger print to verify their identify, when checking-in or checking-out. Although these system can provide a relatively higher level of verification as compared to traditional terminals, they still suffer from shortcomings. For example, in the context of a workplace having on-site biometric attendance terminals, employees may still need to wait in line to access the terminal, which results in wasted time and can require employees to leave their work duties to check-in throughout the work day. Further, the terminals may have a relatively high cost to install and maintain, especially in instances where a workplace has several biometric attendance terminals located throughout a facility. Moreover, these types of systems can still be fooled. For example an employee can use a reproduced fingerprint of another employee to check-in for the other employee.

Certain electronic attendance systems allow persons to claim attendance (or "check-in") by way of mobile electronic devices. Unfortunately, these types of electronic attendance systems can also be defeated. For example, an employee may give their smart phone to another employee attending an event to check-in or check-out for the employee. In an effort to combat these types of devious actions, some attendance verification systems employ personal information to check-in or check-out. For example, an electronic attendance system may require a person to submit biometric information, such as a fingerprint, to verify their identity when checking-in. Unfortunately, such systems may require the dissemination of sensitive information. For example, a server may store the biometric information and other personal information of all of the potential attendees, creating a risk that the biometric information and other personal information can be stolen or otherwise compromised.

Recognizing these and other shortcomings of existing systems, Applicants have developed novel systems and methods of attendance verification using mobile electronic devices (or "mobile devices"). In some embodiments, a person's biometric data is acquired and verified locally by a mobile device associated with the person while the mobile device is located in a geographic region associated with an event, and attendance data, including an indication of the verification of the biometric data along with a unique identifier of the mobile device, such as an international mobile equipment identity (IMEI) of the mobile device, is transmitted to an attendance server that makes a record of the person's attendance of the event based on the attendance data.

In some embodiments, a mobile device (e.g., a mobile phone) having an integrated fingerprint scanner is used to acquire a fingerprint of a person (e.g., an employee) while the mobile device is located in a geographic region of interest (e.g., in a worksite associated with a work shift), the mobile device conducts local processing of the fingerprint acquired to determine whether the acquired fingerprint is consistent with a fingerprint of a person associated with the mobile device, and, in response to determining that the fingerprint acquired is consistent with a fingerprint of a person associated with the mobile device, the mobile device sends, to a remote device (e.g., an attendance server), attendance data including a unique identifier of the mobile device (e.g., an IMEI number of the mobile device) and other relevant attendance information, such as a time and date associated with acquisition of the fingerprint and a location of the mobile device at or near the time of acquisition of the fingerprint. In response to receiving the attendance data, the server records the attendance of the person at the event associated with the time and location, and sends a confirmation of attendance to the mobile device, which can be displayed by and saved at the mobile device.

Such an attendance verification system can enable persons to check-in using an attendance application on their mobile device, without having to visit a physical on-site terminal. In the context of a workplace, for example, such an attendance verification system can enable employees to check-in using an attendance application on their mobile device, without having to physically approach an on-site terminal located at a worksite. This can be advantageous as an employer may not need to incur the expense of purchasing and maintaining on-site terminals, employees may not need to wait in line or leave their work duties to check-in, and the location of the mobile device can be used to prompt employees to check-in or check-out.

Such an attendance verification system may prevent the dissemination of sensitive information. Attendance can be verified without a server needing to store biometric information, such as fingerprints, or other personal information of potential attendees, helping to reduce a risk of biometric information and other personal information being compromised. For example, in some embodiments, biometric data is verified locally on the mobile device, and the attendance data transmitted to an attendance server includes an indication of the verification of the biometric information and a unique identifier of the mobile device, but does not include the actual biometric information. In the context of verification using a person's fingerprint, a person may submit their fingerprint by way of a fingerprint scanner on their mobile device, the finger print may be processed by an attendance verification application on the person's mobile device to verify the identity of the person, and, in response to verifying the identity of the person, the mobile device may send attendance data, including an indication of the verification of the identity of the person and a unique identifier of the mobile device, to an attendance server for use in making a record of the person's attendance at an event, without the mobile device transmitting the person's fingerprint or the server receiving the person's fingerprint.

Such an attendance verification system may reduce network bandwidth requirements. For example, not having to transmit the fingerprint may reduce the amount of data that is transferred to verify persons' attendance. For example, the size of the attendance data for a person may be relatively small in comparison to attendance data for the person that includes an image or other representation of the person's fingerprint, reducing the amount of data transmitted between the mobile device and the attendance server. This can be especially important in the context of an attendance verification system used to verify attendance of a relatively large number of persons on a regular basis, such as a workplace attendance verification system used to verify attendance of hundreds or thousands of employees at various times throughout a workday.

Although certain embodiments are described in the context of a workplace verification system for the purpose of illustration, similar embodiments can be employed in various other contexts. For example, embodiments may be employed to verify attendance of students in classrooms and to verify the attendance of persons at conferences or other events.

Provided in some embodiments is an attendance verification system including an attendance server having a device mapping including a mapping of international mobile equipment identities (IMEIs) to respective personal identifiers, and an attendance record including a listing of attendance events documenting attendance of persons at events. The system further including a mobile electronic device including a memory, an international mobile equipment identity (IMEI) of the mobile electronic device stored in the memory of the mobile electronic device, characteristics of a fingerprint of a person associated with the mobile electronic device stored in the memory of the mobile electronic device, and a fingerprint scanner. The mobile electronic device adapted to perform the following operations: acquire a fingerprint of a user of the mobile electronic device by way of the fingerprint scanner; determine a time and date of the acquisition of the fingerprint of the user by way of the fingerprint scanner; determine a location of the mobile electronic device at the time of the acquisition of the fingerprint of the user by way of the fingerprint scanner; compare characteristics of the fingerprint of the user acquired to the characteristics of the fingerprint of the person associated with the mobile electronic device stored in the memory of the mobile electronic device to determine whether the user is the person associated with the mobile electronic device; and, in response to determining that the user is the person associated with the mobile electronic device, send to the attendance server, attendance data including the following: the IMEI of the mobile electronic device; the time and date of the acquisition of the fingerprint of the user by way of the fingerprint scanner; and the location of the mobile electronic device at the time of the acquisition of the fingerprint of the user by way of the fingerprint scanner. The attendance server adapted to perform the following: in response to receiving the attendance data: determine a personal identifier of the person associated with the mobile electronic device based on a mapping of the IMEI of the mobile electronic device to a personal identifier of the person associated with the mobile electronic device in the device mapping; and generate, in the attendance record, an attendance event associating the person associated with the mobile electronic device with at an event associated with the time and date of the acquisition of the fingerprint of the user by way of the fingerprint scanner and the location of the mobile electronic device at the time of the acquisition of the fingerprint of the user by way of the fingerprint scanner, to document attendance of the person associated with the mobile electronic device at the event.

In some embodiments, the mobile electronic device further includes attendance region data defining geographic extents of an attendance region associated with the event stored in a memory of the mobile electronic device, and the mobile electronic device is further adapted to determine whether the mobile electronic device is located in the attendance region associated with the event, and the acquisition of the fingerprint of the user of the mobile electronic device by way of the fingerprint scanner is performed in response to determining that the mobile electronic device is located in the attendance region associated with the event. In certain embodiments, the mobile electronic device is further adapted to, in response to determining that the mobile electronic device is located in the attendance region associated with the event, prompt the user of the mobile electronic device to submit the fingerprint by way of the fingerprint scanner. In some embodiments, the mobile electronic device is further adapted to, in response to determining that the mobile electronic device is located outside of the attendance region associated with the event, send, to the attendance server, follow-up attendance data including a time at which the mobile electronic device is determined to have exited the attendance region associated with the event. In certain embodiments, the mobile electronic device is further adapted to conduct a registration operation including the following: acquiring the fingerprint of the person associated with the mobile electronic device; and sending, to the attendance server, registration data including the following: the personal identifier of the person associated with the mobile electronic device; and the IMEI of the mobile electronic device; the attendance server further adapted to generate the mapping of the IMEI of the mobile electronic device to the personal identifier of the person associated with the mobile electronic device in the device mapping using the personal identifier of the person associated with the mobile electronic device and the IMEI of the mobile electronic device of the registration data. In some embodiments, the attendance server is adapted to, send to the mobile electronic device, acknowledgement data indicative of the recording of the attendance event, and the mobile electronic device is further adapted to store the acknowledgement data in an attendance log stored in the memory of the mobile electronic device. In certain embodiments, the mobile electronic device includes a cellular mobile phone. In some embodiments, the system further includes a wireless network, and the mobile electronic device and the attendance server communicate by way of the wireless network.

Provided in some embodiments is a method of attendance verification. The method including acquiring, by a mobile electronic device, a fingerprint of a user of the mobile electronic device by way of a fingerprint scanner. The a mobile electronic device including the following: a memory; an international mobile equipment identity (IMEI) of the mobile electronic device stored in the memory of the mobile electronic device; characteristics of a fingerprint of a person associated with the mobile electronic device stored in the memory of the mobile electronic device; and the fingerprint scanner. The method further including the following: determining, by the mobile electronic device, a time and date of the acquisition of the fingerprint of the user by way of the fingerprint scanner; determining, by the mobile electronic device, a location of the mobile electronic device at the time of the acquisition of the fingerprint of the user by way of the fingerprint scanner; comparing, by the mobile electronic device, characteristics of the fingerprint of the user acquired to the characteristics of the fingerprint of the person associated with the mobile electronic device stored in the memory of the mobile electronic device to determine whether the user is the person associated with the mobile electronic device; and in response to the mobile electronic device determining that the user is the person associated with the mobile electronic device, sending, by the mobile electronic device to an attendance server, attendance data including the following: the IMEI of the mobile electronic device; the time and date of the acquisition of the fingerprint of the user by way of the fingerprint scanner; and the location of the mobile electronic device at the time of the acquisition of the fingerprint of the user by way of the fingerprint scanner. The attendance server including a device mapping including a mapping of international mobile equipment identities (IMEIs) to respective personal identifiers, and an attendance record including a listing of attendance events documenting attendance of persons at events. The method further including, in response to the attendance server receiving the attendance data: determining, by the attendance server, a personal identifier of the person associated with the mobile electronic device based on a mapping of the IMEI of the mobile electronic device to a personal identifier of the person associated with the mobile electronic device in the device mapping; and generating, by the attendance server, in the attendance record, an attendance event associating the person associated with the mobile electronic device with at an event associated with the time and date of the acquisition of the fingerprint of the user by way of the fingerprint scanner and the location of the mobile electronic device at the time of the acquisition of the fingerprint of the user by way of the fingerprint scanner, to document attendance of the person associated with the mobile electronic device at the event.

In some embodiments, the mobile electronic device further including attendance region data defining geographic extents of an attendance region associated with the event stored in a memory of the mobile electronic device, the method further including determining, by the mobile electronic device, whether the mobile electronic device is located in the attendance region associated with the event, and the acquisition of the fingerprint of the user of the mobile electronic device by way of the fingerprint scanner being performed in response to determining that the mobile electronic device is located in the attendance region associated with the event. In certain embodiments, the method further includes, in response to the mobile electronic device determining that the mobile electronic device is located in the attendance region associated with the event, prompting, by the mobile electronic device, the user of the mobile electronic device to submit the fingerprint by way of the fingerprint scanner. In some embodiments, the method further includes, in response to the mobile electronic device determining that the mobile electronic device is located outside of the attendance region associated with the event, sending, by the mobile electronic device to the attendance server, follow-up attendance data including a time at which the mobile electronic device is determined to have exited the attendance region associated with the event. In certain embodiments, the method further includes the mobile electronic device conducting a registration operation including the following: acquiring, by the mobile electronic device, the fingerprint of the person associated with the mobile electronic device; and sending, by the mobile electronic device to the attendance server, registration data including the personal identifier of the person associated with the mobile electronic device and the IMEI of the mobile electronic device; and the attendance server generating the mapping of the IMEI of the mobile electronic device to the personal identifier of the person associated with the mobile electronic device in the device mapping using the personal identifier of the person associated with the mobile electronic device and the IMEI of the mobile electronic device of the registration data. In some embodiments, the method further includes the following: sending, by the attendance server to the mobile electronic device, acknowledgement data indicative of the recording of the attendance event; and storing, by the mobile electronic device the acknowledgement data in an attendance log stored in the memory of the mobile electronic device. In certain embodiments, the mobile electronic device is a cellular mobile phone. In some embodiments, the method further includes the mobile electronic device and the attendance server communicating by way of a wireless network.

Provided in some embodiments is a non-transitory computer-readable storage medium having program instructions stored thereon that are executable by a processor to cause the operations including acquiring, by a mobile electronic device, a fingerprint of a user of the mobile electronic device by way of a fingerprint scanner. The a mobile electronic device including the following: a memory; an international mobile equipment identity (IMEI) of the mobile electronic device stored in the memory of the mobile electronic device; characteristics of a fingerprint of a person associated with the mobile electronic device stored in the memory of the mobile electronic device; and the fingerprint scanner. The operations further including the following: determining, by the mobile electronic device, a time and date of the acquisition of the fingerprint of the user by way of the fingerprint scanner; determining, by the mobile electronic device, a location of the mobile electronic device at the time of the acquisition of the fingerprint of the user by way of the fingerprint scanner; comparing, by the mobile electronic device, characteristics of the fingerprint of the user acquired to the characteristics of the fingerprint of the person associated with the mobile electronic device stored in the memory of the mobile electronic device to determine whether the user is the person associated with the mobile electronic device; in response to the mobile electronic device determining that the user is the person associated with the mobile electronic device, sending, by the mobile electronic device to an attendance server, attendance data including the following: the IMEI of the mobile electronic device; the time and date of the acquisition of the fingerprint of the user by way of the fingerprint scanner; and the location of the mobile electronic device at the time of the acquisition of the fingerprint of the user by way of the fingerprint scanner. The attendance server including a device mapping including a mapping of international mobile equipment identities (IMEIs) to respective personal identifiers, and an attendance record including a listing of attendance events documenting attendance of persons at events. The operations further including the following, in response to the attendance server receiving the attendance data: determining, by the attendance server, a personal identifier of the person associated with the mobile electronic device based on a mapping of the IMEI of the mobile electronic device to a personal identifier of the person associated with the mobile electronic device in the device mapping; and generating, by the attendance server, in the attendance record, an attendance event associating the person associated with the mobile electronic device with at an event associated with the time and date of the acquisition of the fingerprint of the user by way of the fingerprint scanner and the location of the mobile electronic device at the time of the acquisition of the fingerprint of the user by way of the fingerprint scanner, to document attendance of the person associated with the mobile electronic device at the event.

In some embodiments, the mobile electronic device further includes attendance region data defining geographic extents of an attendance region associated with the event stored in a memory of the mobile electronic device, the operations further include determining, by the mobile electronic device, whether the mobile electronic device is located in the attendance region associated with the event, and the acquisition of the fingerprint of the user of the mobile electronic device by way of the fingerprint scanner is performed in response to determining that the mobile electronic device is located in the attendance region associated with the event. In certain embodiments, the operations further include, in response to the mobile electronic device determining that the mobile electronic device is located in the attendance region associated with the event, prompting, by the mobile electronic device, the user of the mobile electronic device to submit the fingerprint by way of the fingerprint scanner. In some embodiments, the operations further include, in response to the mobile electronic device determining that the mobile electronic device is located outside of the attendance region associated with the event, sending, by the mobile electronic device to the attendance server, follow-up attendance data including a time at which the mobile electronic device is determined to have exited the attendance region associated with the event. In certain embodiments, the operations further include, the mobile electronic device conducting a registration operation including the following: acquiring, by the mobile electronic device, the fingerprint of the person associated with the mobile electronic device; and sending, by the mobile electronic device to the attendance server, registration data including the personal identifier of the person associated with the mobile electronic device, and the IMEI of the mobile electronic device, and the attendance server generating the mapping of the IMEI of the mobile electronic device to the personal identifier of the person associated with the mobile electronic device in the device mapping using the personal identifier of the person associated with the mobile electronic device and the IMEI of the mobile electronic device of the registration data. In some embodiments, the operations further include, sending, by the attendance server to the mobile electronic device, acknowledgement data indicative of the recording of the attendance event and storing, by the mobile electronic device the acknowledgement data in an attendance log stored in the memory of the mobile electronic device.

Figure 1:
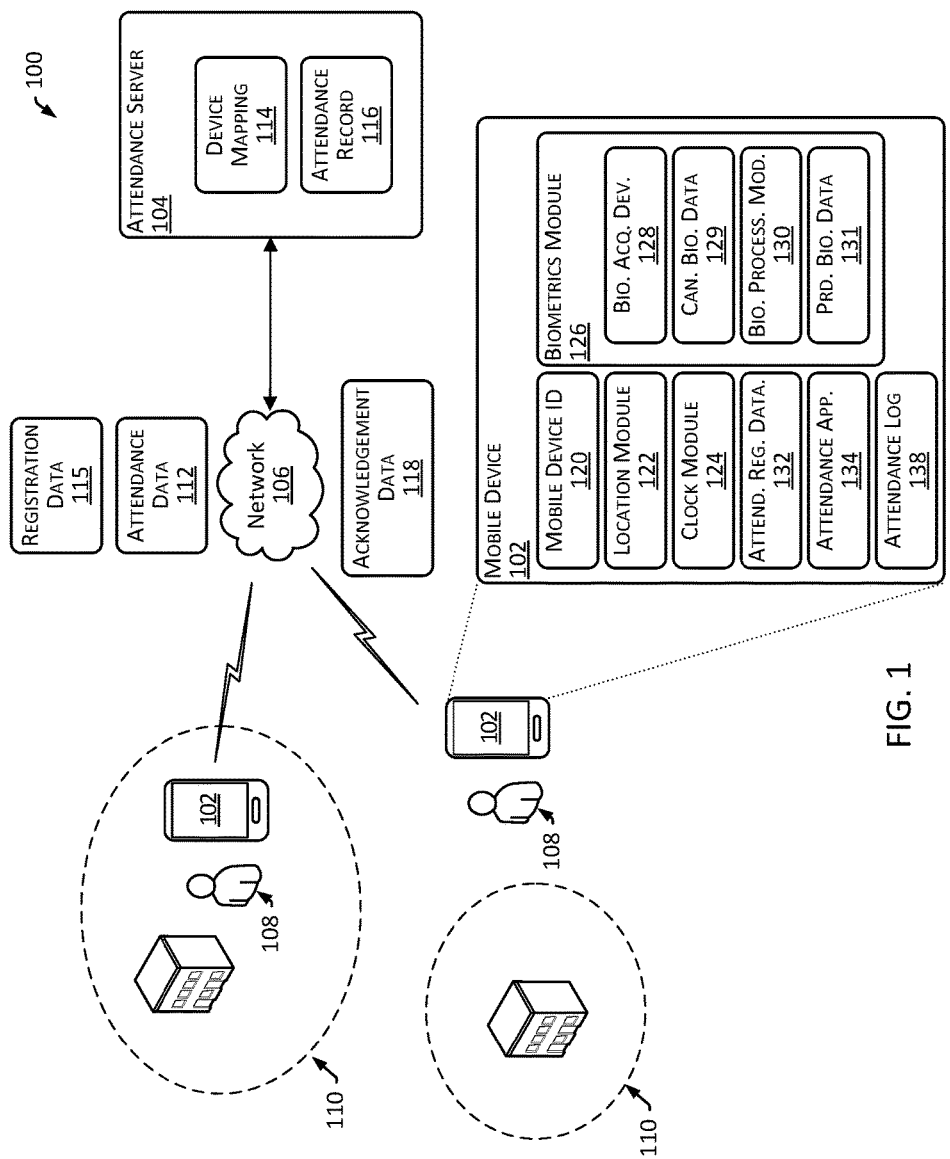
FIG. 1 is a diagram that illustrates an attendance verification system in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of systems and methods of attendance verification using mobile electronic devices (or "mobile devices"). In some embodiments, a person's biometric data is acquired and verified locally by a mobile device associated with the person while the mobile device is located in a geographic region associated with an event, and attendance data, including an indication of the verification of the biometric data along with a unique identifier of the mobile device, such as an international mobile equipment identity (IMEI) of the mobile device, is transmitted to an attendance server that makes a record of the person's attendance of the event based on the attendance data.

FIG. 1 is a diagram that illustrates an attendance verification system "attendance system" 100 in accordance with one or more embodiments. In the illustrated embodiment, the attendance system 100 includes one or more mobile electronic devices ("mobile devices") 102 and an attendance server ("server") 104, communicatively coupled by way of a communications network ("network") 106. Each of the mobile devices 102 may be associated with a given person 108 expected to attend an event, such as a work shift, a class or a presentation.

As described, the mobile devices 102 and the attendance server 104 may exchange data to verify attendance of persons 108 at an event associated with one or more geographic areas of interest ("attendance regions") 110. For example, a mobile device 102 associated with a person 108 and located in an attendance region 110 associated with an event, may verify biometric or other personal information for the person 108 at a time associated with the event, and transmit corresponding attendance data 112, including a unique identifier of the mobile device 102, to the server 104 by way of the network 106. The server 104 may use the attendance data 112 and a device mapping 114 stored at the server 104 to confirm the attendance of the person 108 at the event. In some embodiments, the device mapping 114 is populated based on registration data 115, such as person's names and unique identifiers of associated mobile devices 102, provided by way of the mobile devices 102 during a registration operation. In response to confirming the attendance of the person 108 at the event, the sever 104 may make a record of the attendance of the person 108 at the event in an attendance record 116 stored at the server 104, and send attendance acknowledgement data 118 to the mobile device 102 associated with the person 108. The mobile device 102 may store and display the attendance acknowledgement data 118 for viewing by the person 108.

The network 106 can include an element or system that facilitates communication between the entities of the attendance system 100. For example, the network 106 may include an electronic communications network, such as a local area network (LAN), a wide area network (WAN), a wireless local area network (WLAN), a cellular communications network, a short range wireless communications network (e.g., a Bluetooth wireless network), the Internet, an industrial network, or the like. In some embodiments, the network 106 includes a single network or a combination of networks. In some embodiments, the network 106 includes a wireless network, such as a Wi-Fi or cellular network, that facilitates communication of attendance data 112 and acknowledgement data 118 between the one or more mobile devices 102 and the attendance server 104.

The attendance server 104 may include a computer device for processing attendance data 112 to verify attendance of persons 108 at various events. In some embodiments, the attendance server 104 includes a computer device that is the same or similar to the computer system 1000 described here with regard to at least FIG. 4. In some embodiments, the attendance server 104 stores or otherwise has access to a device mapping 114 that can be used to verify attendance data 112 received. The device mapping 114 may include a mapping of unique identifiers of one or more mobile devices 102 to respective personal identifiers of persons 108. The unique identifier of a mobile device 102 may include, for example, an IMEI of the mobile device 102, or a similar identifier, that can be used to uniquely identify the mobile device 102 from other mobile devices 102. An IMEI of a cellular mobile device 102 may include an identifier that can uniquely identify the cellular mobile device 102 from other cellular devices on one or more cellular networks. An IMEI of a mobile device 102 may be assigned to and stored in a memory of the mobile device 102 (e.g., in non-volatile memory of the mobile device 102, such as flash memory, read-only memory (ROM), programmable read-only memory (PROM), erasable programmable read-only memory (EPROM), electrically erasable programmable read-only memory (EEPROM)) by a manufacture of the mobile device 102, at the time of manufacture of the mobile device 102. A personal identifier of a person 108 may include, for example, a name of the person 108, an employee identifier (ID) associated with the person 108, a student ID associated with the person 108, or a similar identifier that can be used to uniquely identify the person 108 from other persons 108. The device mapping 114 may include, for example, a mapping of a first IMEI number (11111) of a first mobile device 102 to a name ("John Doe") of a first person 108, a mapping of a second IMEI number (11112) of a second mobile device 102 to a name ("Jane Smith") of a second person 108, and so forth. In response to receiving attendance data 112 including an IMEI number, the attendance server 104 may conduct a look-up of an identifier associated with the IMEI, using the device mapping 114, to identify the person 108 for which attendance is to be recorded. For example, in response to the server 104 receiving from a first mobile device 102 having an IMEI of 1111, a first set of attendance data 112 including the IMEI of 1111, a time of 8:01 am, a date of 8.01.2017, and geographic coordinates of a location within a first attendance region 110, the attendance server 104 may conduct a look-up of the IMEI 1111, using the device mapping 114, to identify John Doe as the person 108 for which attendance is to be recorded for an event associated with the first attendance region 110 at 8:01 am on Aug. 1, 2017.

In some embodiments, the attendance server 104 stores or otherwise has access to an attendance record 116 that can be used to record attendance of persons 108 at various events. The attendance record 116 may include a listing of attendance events, each documenting attendance of a person 108 at an event. Each attendance event may include, as a record of a person 108 attending an event, an event identifier, a location, a time, a date, and a personal identifier. The event identifier may include a name or similar identifier of an event associated with an attendance region 110 including the location, and the time and date. For example, where an event "daily 8 am-5 pm shift at a first worksite" is to occur at the first worksite (e.g., at an employer facility) between the hours of 8 am and 5 pm daily, in a first attendance region 110 defined by the extents of the first worksite, in response to the server 104 receiving from a first mobile device 102 (having an IMEI of 1111) a first set of attendance data 112 including the IMEI of 1111, a time of 8:01 am, a date of 08.01.2017, and a location defined by geographic coordinates within the first attendance region 118 defined by the extents of the first worksite, the attendance server 104 may conduct a look-up of the IMEI 1111, using the device mapping 114, to identify John Doe as the person 108 for which attendance is to be recorded, and create an attendance event listing an event identifier of "daily 8 am-5 pm shift at a first worksite", a check-in time of "8:01 am", a date of "08.01.2017", a location including the geographic coordinates within the first attendance region 118, and a personal identifier of "John Doe". Similar listings of attendance events can be generated for each set of attendance data 112 received by the attendance server 104. Such an attendance record 116 may enable an attendance manager, such as an employer, to audit the attendance of persons 108 at various events.

In some embodiments, the attendance server 104 provides acknowledgement data 118 to mobile devices 108. The acknowledgement data 118 provided to a mobile device 102 may include an acknowledgement of receipt of corresponding attendance data 112 from the mobile device 102, and an indication of whether the attendance sever 104 was able to verify the attendance data 112. For example, continuing with the above example, in response to the attendance server 104 identifying John Doe as the person 108 for which attendance is to be recorded, and creating the corresponding attendance event listing for the attendance data 112 in the attendance record 116, the attendance sever 104 may send to the first mobile device 102, first acknowledgement data 118 indicating verification of the corresponding attendance data 112 and the recording of the event listing in the attendance record 116. The first acknowledgement data 118 may include, for example, a statement of "Attendance of John Doe at the daily 8 am-5 pm shift at the first worksite, at 8:01 am on Aug. 1, 2017 has been verified and recorded." As described, the acknowledgement data 118 can be presented and stored locally at the mobile devices 102. For example, in response to an attendance application on the first mobile device 102 receiving the first acknowledgement data 118, the attendance application may cause the first mobile device 102 to display the statement "Attendance of John Doe at the daily 8 am-5 pm shift at the first worksite, at 8:01 am on Aug. 1, 2017 has been verified and recorded," and store a record of the statement in a memory of the first mobile device 102. In some embodiments, if communication between the attendance sever 104 and the mobile device 102 is not available, the attendance server 104 may store the acknowledgement data 118, and queue it to be sent at a later time, when communication between the attendance sever 104 and the mobile device 102 is available.

A mobile device 102 can include a mobile computer device that enables a person 108 to submit proof of attendance, also referred to as an attendance "check-in". In some embodiments, the mobile device 102 includes a computer device that is the same or similar to the computer system 1000 described here with regard to at least FIG. 4. In some embodiments, a mobile device 102 is a smart phone, a tablet computer, or a similar personal computer device. A mobile device 102 may be capable of communicating by way of a wireless network, such as Wi-Fi or cellular, and may be associated with a mobile device identifier 120 that uniquely identifies the mobile device 102 from other mobile devices 102 on the wireless network. A mobile device identifier 120 for a mobile device 102 may include, for example, an IMEI of the mobile device 102, or a similar identifier, that can be used to uniquely identify the mobile device 102 from other mobile devices 102 on a wireless network. An IMEI of a cellular mobile device 102 may include an identifier that can uniquely identify the cellular mobile device 102 from other cellular devices on one or more cellular networks. An IMEI of a mobile device 102 may be assigned to and stored in a memory of the mobile device 102 (e.g., in non-volatile memory of the mobile device 102, such as flash memory, read-only memory (ROM), programmable read-only memory (PROM), erasable programmable read-only memory (EPROM), electrically erasable programmable read-only memory (EEPROM)) by a manufacture of the mobile device 102, at the time of manufacture of the mobile device 102.

In some embodiments, a mobile device 102 includes a location module 122. The location module 122 of a mobile device 102 may be capable of determining and reporting a geographic location of the mobile device 102. For example, a location module 122 of a mobile device 102 may include a global positioning system (GPS) sensor that is capable of determining a location of the mobile device 102. The location may include geographic coordinates (e.g., latitude and longitude coordinates) of the mobile device 102. As a further example, a location module 122 of a mobile device 102 may include a wireless antenna that is capable of receiving and assessing strength of wireless signals. In such an embodiment, the location module 122 may be able to determine a location of the mobile device 102 based on the relative strength of the wireless signals. For example, the location module 122 may be able to determine an approximate distance to a Wi-Fi router based on the strength of a wireless signal from the Wi-Fi router, received at the wireless antenna of the mobile device. The location module 122 may, for example, determine that the mobile device 102 is within a given distance of a Wi-Fi router based on the strength of a wireless signal from the Wi-Fi router being above a threshold value, or determine that the mobile device 102 is more than a given distance from the Wi-Fi router based on the strength of a wireless signal from the Wi-Fi router being below a threshold value. As described, a location of the mobile device 102 at or near a time of acquiring biometric information, such as a fingerprint of a person 108, may be determined by the location module 122 and be provided in attendance data 112 provided to the server 104.

In some embodiments, a mobile device 102 includes a clock module 124. The clock module 124 of a mobile device 102 may be capable of determining and reporting a current time and date. As described, a current time and date at or near a time of acquiring biometric information, such as a fingerprint of a person 108, may be determined by the clock module 124 and be provided in attendance data 112 provided to the server 104.

In some embodiments, a mobile device 102 includes a biometrics module 126. A biometrics module 126 of a mobile device 102 may be capable of acquiring an verifying biometric data for a user of the mobile device 102 locally. For example, a biometrics module 126 may include a biometrics acquisition device 128, such as a fingerprint scanner, for acquiring "candidate" biometric data 129, indicative of biometric characteristics of a user of the mobile device 102 such as a "candidate" fingerprint of a user of the mobile device 102, and a biometrics processing module 130 for comparing characteristics of the biometric data acquired to predefined biometric data 131, such as a fingerprint or characteristics of a finger print of a person 130 associated with the mobile device 102, that can be to verify an identity of the user. In the context of a biometrics module 126 including a fingerprint scanner biometrics acquisition device 128, a user handling the mobile device 102 may place their finger tip on the fingerprint scanner, the finger print scanner may acquire a fingerprint of the user, the biometrics module 126 may determine characteristics of the acquired fingerprint and compare the determined characteristics of the fingerprint of the user (e.g., provided in the biometric data 129) to characteristics of a fingerprint of a person 108 associated with the mobile device 102 (e.g., stored in predefined biometric data 131), to determine whether the user's fingerprint matches the fingerprint of the person 108. In response to determining that the user's fingerprint matches the fingerprint of the person 108, the biometrics module 126 may verify that the user is the person 108 associated with the mobile device 102. That is, the biometrics module 126 may verify the identity of the user as the person 108 associated with the mobile device 102. In response to determining that the user's fingerprint does not match the fingerprint of the person 108 associated with the mobile device 102, the biometrics module 126 may determine that the user is not the person 108 associated with the mobile device 102. That is, the biometrics module 126 may not verify the identity of the user as the person 108 associated with the mobile device 102. As described, in some embodiments, the characteristics of a fingerprint of a person 108 associated with the mobile device 102 are determined by way of a registration process, and may be stored locally in a memory of the mobile device 102.

In some embodiments, a mobile device 102 includes attendance region data 132. Attendance region data 132 stored in a memory of a mobile device 102 associated with a person 108 may include data defining geographic extents of one or more attendance regions 110 in which the mobile device 102 or the person 108 are expected to be located in to attend a corresponding event. In some embodiments, the attendance region data 132 includes relevant timeframes for attendance in the one or more attendance regions 110. Continuing with the above example, if John Doe is an employee of ABC corporation, Jon Doe is scheduled to work daily at three different worksites of ABC corporation between the hours of 8 am and 5 pm daily, and John Doe's attendance is tracked at each of the three worksites, the first mobile device 102 associated with John Doe may store or otherwise have access to attendance region data 132, including first attendance region data defining a first attendance region 110 defined by the geographic extents of the first worksite and a timeframe of 8 am-5 pm daily, second attendance region data defining a second attendance region 110 defined by the geographic extents of the second worksite and a timeframe of 8 am-5 pm daily, and third attendance region data defining a third attendance region 110 defined by the geographic extents of the third worksite and a timeframe of 8 am-5 pm daily. As described, in some embodiments, the attendance region data 132 may be used to determine when a mobile device 102 is located in an attendance region 110 in which the mobile device 102 or the person 108 are expected to be located in to attend a corresponding event.

In some embodiments, a mobile device (e.g., a mobile phone) 102 having an integrated fingerprint scanner biometrics acquisition device 128 is used to acquire a fingerprint of a person (e.g., an employee) 108 while the mobile device 102 is located in an attendance region (e.g., in a worksite associated with a work shift) 110, the mobile device 120 conducts local processing of the fingerprint acquired to determine whether the acquired fingerprint is consistent with a fingerprint of a person 108 associated with the mobile device 102, and, in response to determining that the fingerprint acquired is consistent with a fingerprint of a person 108 associated with the mobile device 102, the mobile device 102 sends, to the attendance server 104, attendance data 112 including a unique identifier of the mobile device (e.g., an IMEI number of the mobile device) 102 and other relevant attendance information, such as a time and date associated with acquisition of the fingerprint and a location of the mobile device 102 at or near the time of acquisition of the fingerprint. In response to receiving the attendance data 112, the attendance server 104 verifies and records the attendance of the person 108 at the event associated with the time and location, and sends, to the mobile device 102, acknowledgement data 118, including confirmation of attendance, which is displayed by and stored in a memory of the mobile device 102.

In some embodiments, a mobile device 102 includes an attendance application 134. An attendance application 134 stored on a mobile device 102 may be executed by the mobile 102 to, for example, acquire and verify biometric data for person 108, generate and transmit attendance data 112, and receive and process acknowledgement data 118. In some embodiments, an attendance application 134 of a mobile device 102 is selectively opened. For example, a person 108 may select to launch the attendance application 134 on the mobile device 102. In an initial launch of the attendance application 134 on the mobile device 102, the attendance application 134 may conduct a registration operation that directs the person 108 to register with the attendance application. In an registration operation, the attendance application 134 may query the person 108 to submit personal information, such as a personal identifier (e.g., their name and employee ID), login credentials (e.g., a user ID and password used to access the attendance application 134), and query the person 108 to submit biometric information, such as a fingerprint. The person 108 may submit the personal information by way of a keyboard of the mobile device 102 and submit their biometric information, such as a fingerprint, by way of an integrated biometrics acquisition device 128, such as a fingerprint scanner, of the mobile device 102. The attendance application 134 may store the personal information and the biometric information, in association with one another, locally in a memory of the mobile device 102, and may transmit corresponding registration data 115, including the personal information and a mobile device identifier 120 of the mobile device 102, to the attendance server 104. In response to receiving the personal information for the person 108, the attendance server 104 may identify one or more attendance regions 110 associated with the person 108, and transmit attendance region data 132, including data defining the one or more attendance regions 110 associated with the person 108 and respective timeframes for attendance of the person 108 in the regions 110, to the mobile device 102. The attendance application 134 may store the attendance region data 132 locally, in a memory of the mobile device 102.

The attendance application 134 may monitor a geographic location of the mobile device 102 determined by the location module 122 to determine whether the mobile device 102 is located in one of the one or more attendance regions 110 associated with the person 108 during an associated timeframe for attendance of the person 108 in the region 110. In response to determining that the mobile device 102 is located in an attendance region 110 associated with the person 108 during a timeframe for attendance of the person 108 in the region 110, the attendance application 134 may query a current user of the mobile device 102 to submit biometric information, such as a fingerprint, to verify whether the user is the person 108 associated with the mobile device 102 by way of the registration process. In response to receiving biometric information of the user by way of the biometrics acquisition device 128 of the mobile device 102, such as a fingerprint of the user acquired by way of an integrated fingerprint scanner of the mobile device 102, the biometrics module 126 may determine whether the user is the person 108 associated with the mobile device 102, for example, by comparing the acquired fingerprint of the user to the fingerprint obtained for the person 108 during the registration operation. In response to the biometrics module 126 determining that the user is the person 108 associated with the mobile device 102, the attendance application 134 may assemble corresponding attendance data 112. The attendance data 112 may include, for example, a time and date associated with acquisition of the biometric information (e.g., a time and date of 8:01 am, Aug. 1, 2017, corresponding to a time at which the fingerprint was acquired, and obtained from the clock module 124), a location of the mobile device 102 at or near the time of acquisition of the biometric information (e.g., latitude and longitude coordinates of the mobile device 102 at or near the time and date at which the fingerprint was acquired, and obtained from the location module 122), and the mobile device identifier 120 of the mobile device 102 (e.g., an IMEI number of the mobile device 102 retrieved from a memory of the mobile device 102). In some embodiments, if communication between the mobile device 102 and the attendance sever 104 is not available, the mobile device 102 may store the attendance data 112 locally, and queue it to be sent at a later time when communication between the mobile device 102 and the attendance sever 104 is available. As described, the attendance server 104 may process the attendance data 112 and provide corresponding acknowledgement data 118. The attendance application 134 may, in response to receiving the acknowledgement data 118, display the acknowledgement data 118 and store it in an attendance log 138 in a memory of the mobile device 102. The attendance log 138 of a mobile device 102 may include a record of the attendance data 112 transmitted by the mobile device 102 and the acknowledgement data 118 received by the mobile device 102.

Figure 2A:
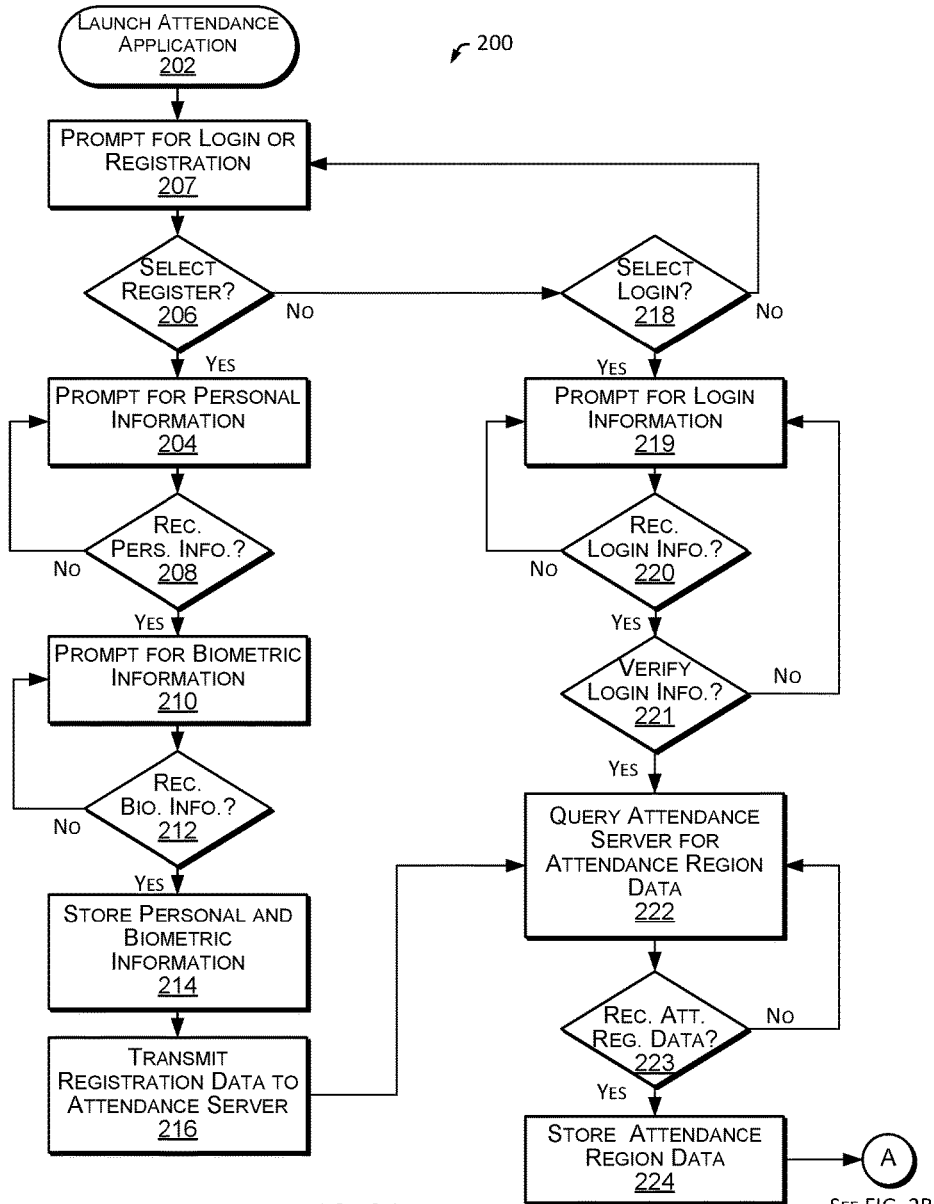
FIGS. 2A-2C are flowchart diagrams that illustrates a method operating a mobile device to verify attendance in accordance with one or more embodiments.
Figure 2B:
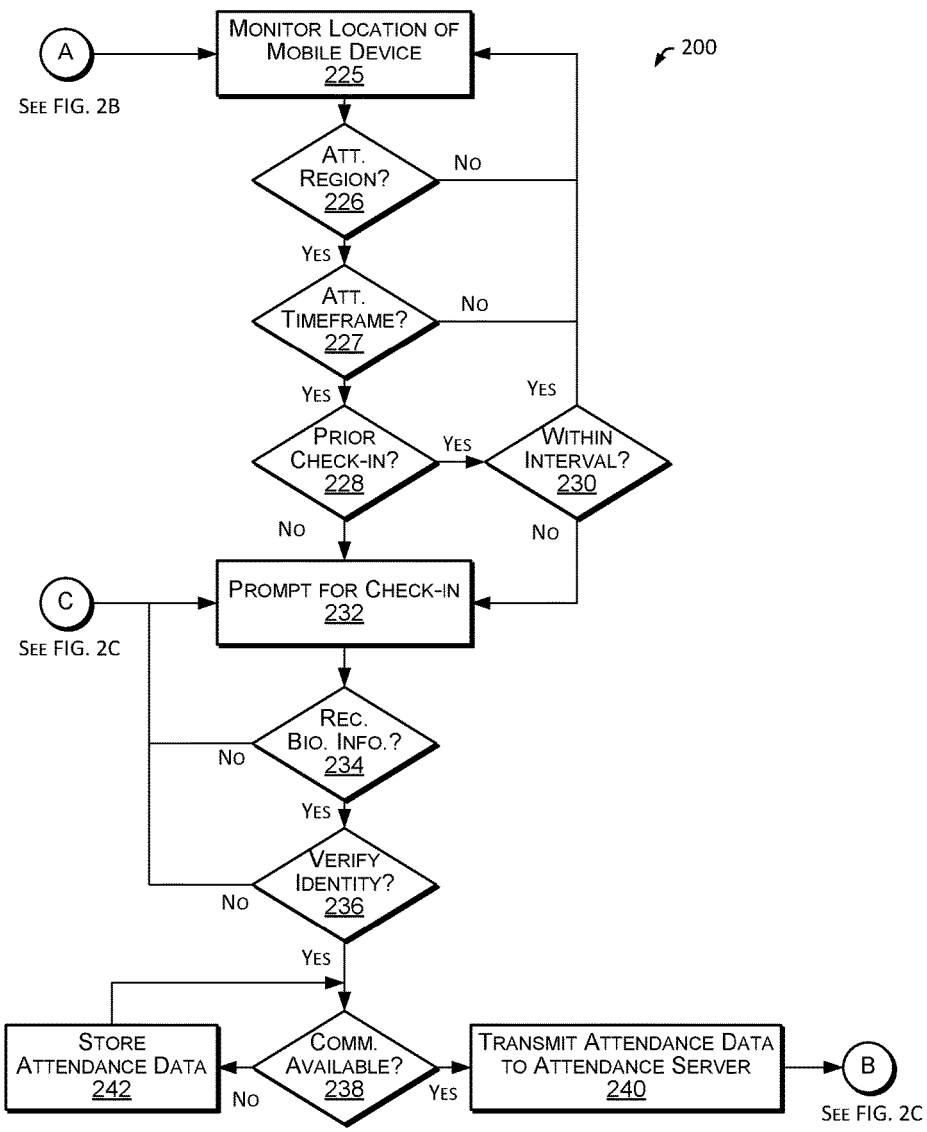

FIGS. 2A-2B are flowchart diagrams that illustrates a method 200 operating a mobile device 102 to verify attendance in accordance with one or more embodiments. In some embodiments, the method includes launching an attendance application 134 on the mobile device 102 (block 202). This can include a person 108 selecting to open the attendance application 134 on the mobile device 102. For example, the mobile device 102 may launch the attendance application 134 in response to a person 108, John Doe, selecting to open the attendance application 134 by way of a user interface of the mobile device 102. Once opened, the attendance application 134 may cause the mobile device 102 to prompt the person 108 to submit login credentials or select to register with the attendance verification system 100 (block 204).

In response to receiving a selection to register with the attendance verification system 100 (block 206), the attendance application 134 may cause the mobile device 102 to prompt the person 108 to submit personal information, such as a personal identifier (e.g., their name or employee ID), and login credentials (e.g., user ID and password) used to access the attendance application 134) (block 207). For example, the person 108 John Doe may submit his personal information, including the name "John Doe" or employee ID "ABC119") and login credentials including a user ID "jdoe" and password "jd123" by way of a keyboard or similar user interface of the mobile device 102.

In response to receiving the personal information (block 208), the attendance application 134 may cause the mobile device 102 to prompt the person 108 to submit biometric information, such as a fingerprint (block 210). The person 108 may submit their fingerprint by way of an integrated fingerprint scanner biometrics acquisition device 128 of the mobile device 102. For example, the person 108 John Doe may place his fingertip on the fingerprint scanner biometrics acquisition device 128 of the mobile device 102 to submit his fingerprint.

In response to receiving the biometric information (block 212), the attendance application 134 may cause the mobile device 102 to store the personal information for the person 108 and the biometric information for the person 108, in association with one another, locally in a memory of the mobile device 102 (block 214) and to transmit registration data 115, including some or all of the personal information and a mobile device identifier 120 (IMEI of "1111") of the mobile device 102, to the attendance server 104 (block 216). For example, the mobile device 102 (having a mobile device identifier 120 IMEI of "1111") may store John Doe's personal information, (e.g., including the name "John Doe" or the employee ID "ABC119") and login credentials (e.g., including the user ID "jdoe" and the password "jd123") in a memory of the mobile device 102, and send John Doe's registration data 115 (e.g., including the name "John Doe" or the employee ID "ABC119" and the mobile device identifier 120 IMEI of "1111") to the attendance server 104. As described, the attendance server 104 may store or otherwise make a record of the registration data 115, including the personal information for the person 108 received and the mobile device identifier 120 of the mobile device 102. The attendance server 104 may, for example, generate a corresponding entry in the device mapping 114, mapping the employee name "John Doe" to the IMEI of "1111". This may complete the registration of the person 108 with the attendance verification system 100.

In response to receiving a selection to login with the attendance verification system 100 (block 218), the attendance application 134 may cause the mobile device 102 to prompt the person 108 to submit login information, such as login credentials used to access the attendance application 134) (block 219). In response to the person 108 submitting login credentials (block 220), the attendance application 134 may cause the mobile device 102 to verify the login credential (block 221). For example, in response to the person 108 John Doe selecting to login, and submitting the user ID "jdoe" and the password "jd123", the attendance application 134 may cause the mobile device 102 to verify the login credentials.

In response to the person 108 completing registration with the attendance verification system 100 (block 216), or the login credentials of the person 108 being verified (block 221), the attendance application 134 may proceed to cause the mobile device 102 to query the attendance server 104 for attendance region data 132 for the person 108 (block 222). The attendance region data 132 may define one or more attendance regions 110 associated with the person 108, respective timeframes for attendance of the person 108 in the attendance regions 110, and corresponding check-in intervals for the attendance regions 110. For example, the attendance region data 132 for the person 108 John Doe may include a first subset of attendance region data 132 defining a first attendance region 110 including a geographic area of a first worksite and defining a first attendance timeframe of 8 am-5 pm daily (e.g., corresponding to a first of two facilities John Doe is scheduled to work at each day) and a 1 hour check-in interval; a second subset of attendance data region data 132 defining a second attendance region 110 including a geographic area of a second worksite and defining a second attendance timeframe of 8 am-5 pm daily (e.g., corresponding to a second of two facilities John Doe is scheduled to work at each day) and a 1 hour check-in interval; and a third subset of attendance data region data 132 defining a third attendance region 110 including a geographic area of a classroom and defining a third attendance timeframe of 8 am-1 pm on Aug. 2, 2017 (e.g., corresponding to a training class John Doe is scheduled to attend) and a 4 hour check-in interval. In response to the mobile device 102 receiving the attendance region data 132 (block 223), the attendance application 134 may cause the mobile device 102 to store the attendance region data 132 in a local memory of the mobile device 102 (block 224).

The attendance application 134 may proceed to causing the mobile device 102 to monitor the location of the mobile device 102 (block 225) (see FIG. 2B). Monitoring the location of the mobile device 102 may include regularly (e.g., once per minute) querying the location module 122 for a current geographic location of the mobile device 102 and comparing the current geographic location of the mobile device 102 with the areas of the attendance regions 110 of the attendance region data 132 stored in the memory of the mobile device 102. In response to determining that the mobile device 102 is located in an area of an attendance region 110 of the attendance region data 132 (block 226), the attendance application 134 may cause the mobile device 102 to determine whether the current time is within the attendance timeframe specified for the attendance region 110 (block 227). This can include querying the clock module 124 of the mobile device 102 for the current time. In response to determining that the current time is within the attendance timeframe specified for the attendance region 110, the attendance application 134 may cause the mobile device 102 to determine, based on the attendance log 138, whether the person 108 has previously checked-in at the attendance region 110 (block 228). In response to determining that the person 108 has previously checked-in at the attendance region 110, the attendance application 134 may cause the mobile device 102 to determine, based on the attendance log 138, an elapsed time since the last check-in of the person 108 at the attendance region 110 and compare the elapsed time to a predefined check-in interval (e.g., 1 hour check-in interval) for the attendance region 110 to determine whether the person 108 has not checked-in within the check-in interval for the attendance region 110 (e.g., has not checked-in within the last 1 hour) (block 230). In response to determining that the person 108 has not previously checked-in at the attendance region 110 or the person 108 has not checked-in within the check-in interval for the attendance region 110, the attendance application 134 may cause the mobile device 102 to prompt the person 108 using the mobile device 102 to check-in (block 232). Prompting the person 108 to check-in can include the mobile device 102 displaying a prompt requesting that the person 108 submit their biometric information, such as a displayed or audible prompt stating "Please scan your fingerprint to verify your attendance."

In response to the mobile device 102 receiving biometric data for the person 108 by way of the biometrics acquisition device 128 of the mobile device 102 (block 234), the attendance application 134 may cause the mobile device 102 to compare characteristics of the biometric data received to characteristics of the biometric data acquired from the person 108 during the registration process and stored locally on the mobile device 102, to verify an identity of the person 108 for which biometric data is received (block 236). This may include, for example, receiving a finger print for the person 108 by way of a fingerprint scanner of the mobile device 102, and in response to receiving the fingerprint, comparing characteristics of the fingerprint to characteristics of the registered fingerprint for the person 108 John Doe obtained during the registration process and stored locally on the mobile device 102, to determine whether the fingerprints match. If the fingerprints do match it can be determined that the acquired finger print is that of the person 108 (e.g., John Doe) registered with the mobile device 102, and the person attempting to check-in is the person 108 registered with the mobile device 102. If the fingerprints do not match it can be determined that the acquired finger print is not that of the person 108 registered with the mobile device 102, and the person attempting to check-in is not the person 108 registered with the mobile device 102.

In response to the attendance application 134 verifying an identity of the person 108 for which biometric data is received (and determining that communication with the attendance server 104 is available (block 238)), the attendance application 134 may cause the mobile device 102 to transmit corresponding attendance data 112 to the server 104 by way of the network 106 (block 240). The attendance data 112 may include a time, date, location associated with the submission of the biometric information, and a unique identifier of the mobile device 102. For example, if the attendance application 134 verifies an identity of the person 108 John Doe by way of his submission of his fingerprint using the biometrics acquisition device 128 of the mobile device 102 having an IMEI of "1111" at 8:01 am on Aug. 1, 2017, the attendance application 134 may cause the mobile device 102 to transmit corresponding attendance data 112, including the check-in time of "8:01 am", the date of "08.01.2017", an indication of the attendance region (e.g., "first attendance region" or the geographic coordinates of the location of the mobile device 102 at the time the fingerprint is acquired) and the IMEI of "1111", to the server 104 by way of the network 106. As described, the attendance server 104 may use the attendance data 112 to update the overall attendance record 116. In some embodiments, if communication between the mobile device 102 and the attendance sever 104 is not available, the attendance application 134 may cause the mobile device 102 to store the attendance data 112 locally, in a memory of the mobile device 102 (block 242), and send it at a later time when communication between the mobile device 102 and the attendance sever 104 is available.

Figure 2C:
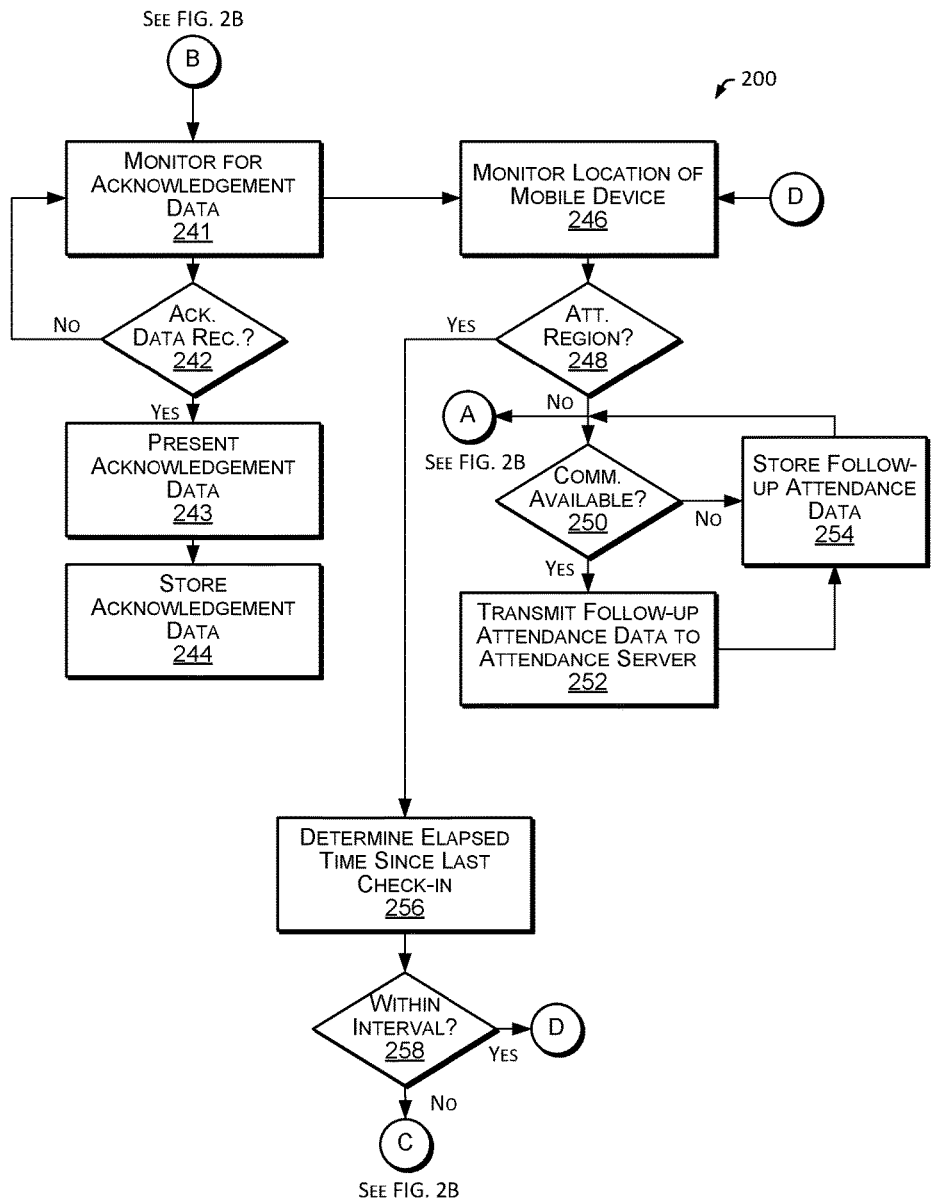

In response to transmitting the corresponding attendance data 112 to the server 104, the attendance application 134 may cause the mobile device 102 to monitor communications from the attendance server 104 for corresponding acknowledgement data 118 (block 241) (See FIG. 2C). The acknowledgement data 118 may include an acknowledgement of receipt of corresponding attendance data 112 from the mobile device 102 and an indication of whether the attendance sever 104 was able to verify the attendance data 112. Continuing with the above example, in response to the attendance server 104 identifying John Doe as the person 108 for which attendance at the first attendance region 110 (corresponding to the first worksite John Doe is scheduled to work at each day) at 8:01 am on Aug. 1, 2017 is to be recorded, the attendance sever 104 may send to the first mobile device 102 (associated with John Doe and having the IMEI of "1111"), first acknowledgement data 118 indicating verification of the attendance data 112. The first acknowledgement data 118 may include, for example, a statement of "Attendance of John Doe at the daily 8 am-5 pm shift at the first worksite, at 8:01 am on Aug. 1, 2017 has been verified and recorded."

In response to the attendance application 134 determining that the mobile device 102 has received corresponding acknowledgement data 118 (block 242), the attendance application 134 may cause the mobile device 102 to present an indication of the acknowledgement data 118 (block 243) and store the acknowledgement data 118 locally, in a memory of the mobile device 102 (block 244). For example, in response to the attendance application 134 on the first mobile device 102 receiving the first acknowledgement data 118 confirming the attendance of John Doe at the first worksite, the attendance application 134 may cause the first mobile device 102 to display the statement "Attendance of John Doe at the daily 8 am-5 pm shift at the first worksite, at 8:01 am on Aug. 1, 2017 has been verified and recorded," and store a record of the statement in the attendance log 138 of the first mobile device 102.

In some embodiments, the attendance application 134 may monitor a geographic location of the mobile device 102 determined by the location module 122 to determine whether the mobile device 102 exits or is otherwise no longer located in the attendance region 110 (block 246). In response to determining that the mobile device 102 exits or is otherwise no longer located in the attendance region 110 (block 248) (and determining that communication with the attendance server 104 is available (block 250)), the attendance application 134 may cause the mobile device 102 to transmit corresponding follow-up attendance data 112 to the server 104 by way of the network 106 (block 252). The follow-up attendance data 112 may indicate a time at which the mobile device 102 exits or is otherwise no longer located in the attendance region 110. Continuing with the above example, if John Doe leaves the first worksite at 5:05 pm on Aug. 1, 2017, after completing his shift at the first worksite defined by the first attendance region 110, and the attendance application 134 determines that John Does has exited the first attendance region 110 based on a current location provided by the location module 122 being outside of the bounds of the first attendance region 110, then the attendance application 134 may determine that the first mobile device 102 having an IMEI of "1111" has exited or is otherwise no longer located in the attendance region 110 and cause the mobile device 102 to transmit corresponding follow-up attendance data 112, including the time of "5:05 pm", the date of "08.01.2017", an indication of the exit from attendance region (e.g., "exit first attendance region" or the geographic coordinates of the location of the first mobile device at the time of the exit from the first attendance region) and the IMEI of "1111", to the server 104 by way of the network 106. As described, the attendance server 104 may use the attendance data 112 to update the overall attendance record 116. In some embodiments, if communication between the mobile device 102 and the attendance sever 104 is not available, the attendance application 134 may cause the mobile device 102 to store the follow-up attendance data 112 locally (block 254), and send it at a later time when communication between the mobile device 102 and the attendance sever 104 is available. In response to determining that the mobile device 102 exits or is otherwise no longer located in the attendance region 110 (block 248), the attendance application 134 may cause the mobile device 102 to return to monitoring the location of the mobile device 102 (block 225) (see FIG. 2B).

In response to determining that the mobile device 102 remains located in the attendance region 110 (block 248), the attendance application 134 may cause the mobile device 102 to determine, based on the attendance log 138 of the mobile device, an elapsed time since the last check-in of the person 108 at the attendance region 110 (block 256) and to compare the elapsed time to a predefined check-in interval (e.g., 1 hour) for the attendance region 110 (e.g., defined by the attendance region data 132 for the attendance region 110) to determine whether the person 108 has checked-in within the check-in interval for the attendance region 110 (block 258). In response to determining that the person 108 has not checked-in within the check-in interval for the attendance region 110, the attendance application 134 may cause the mobile device 102 to conduct a check-in operation, including returning to prompting the person 108 to check-in (block 232) (see FIG. 2B). For example, if the attendance log 138 of the first mobile device 102 indicates that John Doe checked in at 8:01 am, the clock module 124 of the mobile device 102 indicates that the current time is 9:01 am, and the attendance region data 132 on the mobile device 102 indicates a check-in interval of 1 hour for the first worksite defined by the first attendance region 110, then the attendance application 134 may cause the mobile device 102 to determine, based on the attendance log 138 of the mobile device, an elapsed time of one hour since the last check-in of John Doe at the first worksite defined by the first attendance region 110, and may cause the mobile device 102 to perform a check-in operation at 9:01 am, including prompting John Doe to check-in again. A similar re-check-in process may be repeated at 10:01 am, 11:01 am and so forth, until the end of John Doe's shift at 5 pm. In response to determining that the person 108 has checked-in within the check-in interval for the attendance region 110, the attendance application 134 may cause the mobile device 102 to return to monitoring a geographic location of the mobile device 102 determined by the location module 122 to determine whether the mobile device 102 exits or is otherwise no longer located in the attendance region 110 (block 246).

Figure 3:
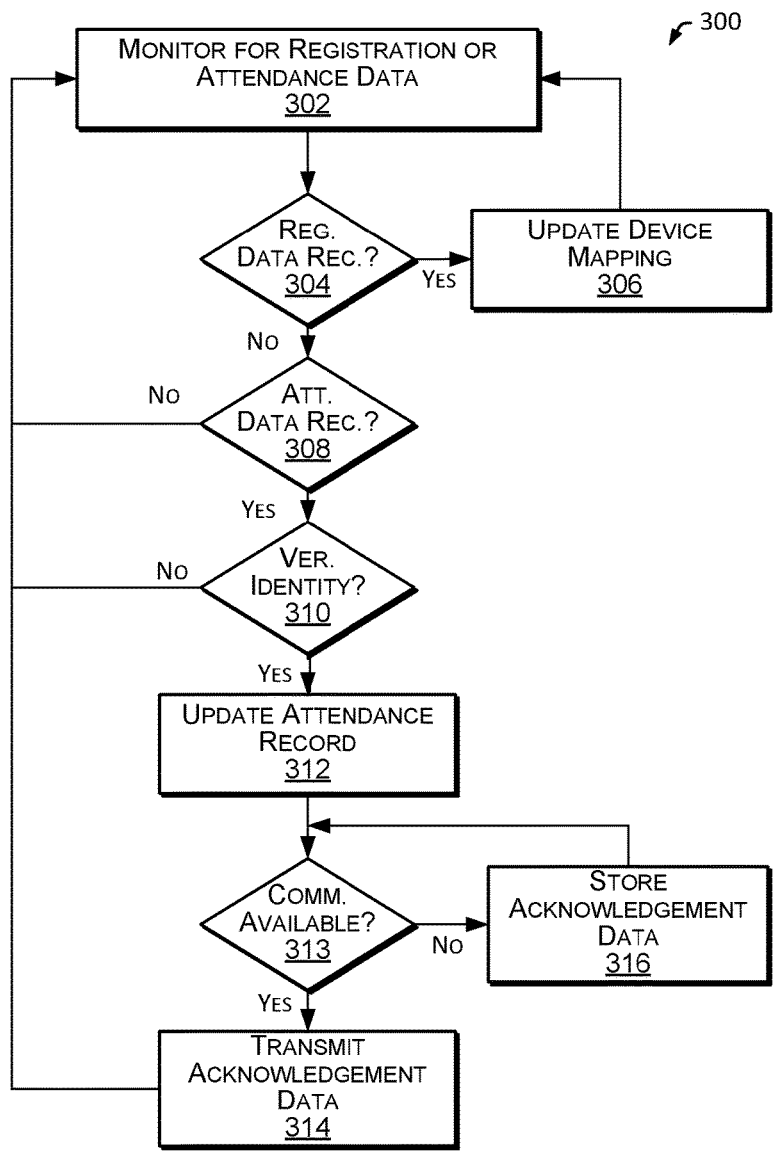
FIG. 3 is a flowchart diagram that illustrates a method operating an attendance server to record attendance in accordance with one or more embodiments.

FIG. 3 is a flowchart diagram that illustrates a method 300 operating the attendance server 104 to verify and record attendance in accordance with one or more embodiments. In some embodiments, the method 300 includes monitoring for the receipt of registration data 115 or attendance data 112 from one or more mobile devices 104 (block 302).

In response to receiving registration data 115 (block 304), the attendance server 104 may update the device mapping 114 to reflect the registration data 115 received (block 306). For example, in response to receiving from the first mobile device 102, registration data 115 including personal information, including the name "John Doe" and employee ID "ABC119", and a unique identifier of the mobile device 102, including the IMEI "1111" for the first device 102, the attendance server 104 may generate an entry in the device mapping 114 that relates (or "maps") one or both of the name "John Doe" and employee ID "ABC119" to the IMEI "1111". As described, such a mapping can be used to lookup the personal information based on the unique identifier of the mobile device 102, or vice versa.

In response to receiving attendance data 112 (block 308), the attendance server 104 may verify the existence of a mapping associated with the unique mobile device identifier of the attendance data 112 (block 310). This can include determining whether the device mapping 114 includes a mapping of the unique mobile device indicator to the personal information. For example, if the attendance data 112 received includes the check-in time of "8:01 am", the date of "08.01.2017", an indication of the first attendance region (e.g., "first attendance region" or the geographic coordinates of the location of the first mobile device 102 indicating the mobile device 102 is located in first attendance region 110 at the time the fingerprint is acquired) and the IMEI of "1111", the attendance server 104 may determine whether the device mapping 114 includes a mapping of the IMEI "1111" to personal information, such as that for John Doe. As a further example, if follow-up attendance data 112 received includes the time of "5:01 pm", the date of "08.01.2017", an indication of a location outside of the first attendance region (e.g., "exited first attendance region" or the geographic coordinates of the location of the first mobile device 102 indicating the mobile device 102 is located outside the first attendance region 110) and the IMEI of "1111", the attendance server 104 may determine whether the device mapping 114 includes a mapping of the IMEI "1111" to personal information, such as that for John Doe.

In response to verifying the existence of a mapping associated with the unique mobile device indicator of the attendance data 112 (e.g., determining that the device mapping 114 includes a mapping of the IMEI "1111" to personal information, such as that for John Doe), the attendance server 104 may proceed to updating an attendance record for the person 108 corresponding to the personal information mapped to the unique mobile device identifier (block 312). This can include, for example, updating an attendance record for the person 108 corresponding to the personal information mapped to the unique mobile device identifier to indicate attendance of the person 108 in an attendance region 110. Continuing with the above example relating to the initial attendance data 112, the attendance server 104 may use the attendance data 112 to update the overall attendance record 116 to include an attendance event listing an event identifier of "daily 8 am-5 pm shift at a first worksite", a check-in time of "8:01 am", a date of "08.01.2017", a location (indication of the first attendance region (e.g., "first attendance region" or the geographic coordinates of the location of the first mobile device 102 indicating the mobile device 102 is located in first attendance region 110) and the personal identifier of "John Doe" mapped to the IMEI "1111". As a further example, continuing with the above example relating to follow-up attendance data 112, the attendance server 104 may use the attendance data 112 to update the attendance event listing an event identifier of "daily 8 am-5 pm shift at a first worksite" to include a check-out time of "5:01 pm", check-out date of "08.01.2017", a check-out location (e.g., "outside first attendance region" or the geographic coordinates of the location of the first mobile device 102 indicating the mobile device 102 is located outside of the first attendance region 110). Similar listings of attendance events can be generated for the sets of attendance data 112 received by the attendance server 104. Such an attendance record 116 may enable an attendance manager, such as an employer, to audit the attendance of persons 108 at various events.

In response to updating an attendance record for a person 108 corresponding to the personal information mapped to the unique mobile device identifier (and determining that communication with the mobile device 102 is available (block 313)), the attendance server 104 may proceed to transmit acknowledgement data 118 to the mobile device 102 (block 314). The acknowledgement data 118 provided to a mobile device 102 may include an acknowledgement of receipt of attendance data 112 from the mobile device 102 and an indication of whether the attendance sever 104 was able to verify the attendance data 112. Continuing with the above example, in response to the attendance server 104 identifying John Doe as the person 108 for which attendance is to be recorded, and creating the attendance event listing for the attendance data 112, the attendance sever 104 may send to the first mobile device 102, first acknowledgement data 118 indicating verification of the attendance data 112 and the recording of the listings of attendance. The first acknowledgement data 118 may include, for example, a statement of "Attendance of John Doe at the daily 8 am-5 pm shift at the first worksite, at 8:01 am on Aug. 1, 2017 has been verified and recorded." Follow-up first acknowledgement data 118 may include, for example, a statement of "Attendance of John Doe at the daily 8 am-5 pm shift at the first worksite from 8:01 am to 5:01 pm on Aug. 1, 2017 has been verified and recorded." As described, the acknowledgement data 118 may presented and stored at the mobile devices 102. In some embodiments, if communication between the attendance sever 104 and the mobile device 102 and is not available, the attendance server 104 may store the acknowledgement data 118 locally, in a memory of the attendance server 104 (block 316), and send it at a later time when communication between the mobile device 102 and the attendance sever 104 is available.

Figure 4:
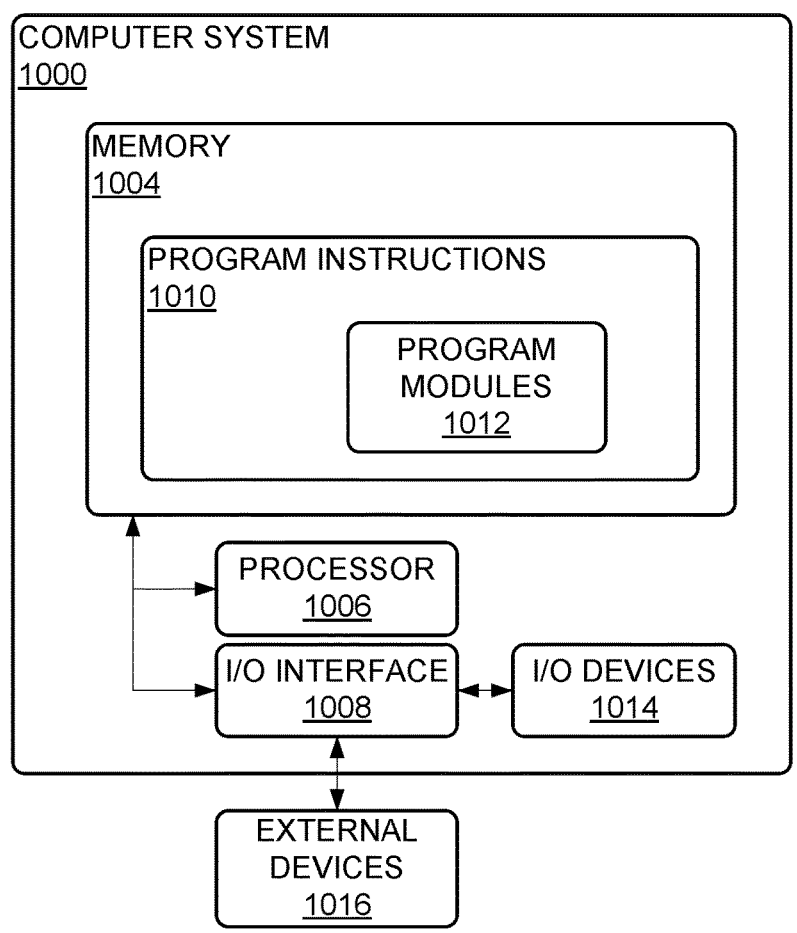
FIG. 4 is a diagram that illustrates an example computer system in accordance with one or more embodiments.

FIG. 4 is a diagram that illustrates an example computer system 1000 in accordance with one or more embodiments. In some embodiments, the system 1000 may be a programmable logic controller (PLC). The system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM or DVD-ROM, hard drives), or the like. The memory 1004 may include a non-transitory computer-readable storage medium storing program instructions 1010. The program instructions 1010 may include program modules 1012 that are executable by a computer processor (e.g., the processor 1006) to cause the functional operations described here, including those described with regard to the attendance verification system 100, the mobile device 102, the attendance application 134, the attendance server 104, the method 200 or the method 300.

The processor 1006 may be any suitable processor capable of executing program instructions. The processor 1006 may include a central processing unit (CPU) that carries out program instructions (e.g., the program instructions of the program module(s) 1012) to perform the arithmetical, logical, and input/output operations described here. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), or the like. The I/O devices 1014 may include one or more of the user input devices. The I/O devices 1014 may be connected to the I/O interface 1008 by way of a wired (e.g., Industrial Ethernet) or a wireless (e.g., Wi-Fi) connection. The I/O interface 1008 may provide an interface for communication with one or more external devices 1016, such as other computers, networks, or the like. In some embodiments, the I/O interface 1008 may include an antenna, a transceiver, or the like. In some embodiments, the external devices 1016 may include a mobile device, a wireless network access point (e.g., a cellular access point or Wi-Fi access point), or a sever.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described. The processes and methods may be modified to facilitate variations of their implementation and use. The order of the processes and methods and the operations provided may be changed, and various elements may be added, reordered, combined, omitted, modified, etc.

Portions of the processes and methods may be implemented in software, hardware, or a combination thereof. Some or all of the portions of the processes and methods may be implemented by one or more of the processors, modules, or applications described here.

As used throughout this application, the word "may" is used in a permissive sense (such as, meaning having the potential to), rather than the mandatory sense (such as, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. An attendance verification system comprising:
   an attendance server comprising:
      a device mapping comprising a mapping of international mobile equipment identities (IMEIs) to respective personal identifiers; and
      an attendance record comprising a listing of attendance events documenting attendance of persons at events; and
   a mobile electronic device comprising:
      a memory, an international mobile equipment identity (IMEI) of the mobile electronic device stored in the memory of the mobile electronic device; and
      a fingerprint scanner,
   the mobile electronic device configured to:
      conduct a registration operation comprising:
         acquiring the fingerprint of the person associated with the mobile electronic device;
         storing, in the memory of the mobile electronic device, the characteristics of the fingerprint of the person associated with the mobile electronic device; and
         sending, to the attendance server, registration data comprising:
            a personal identifier of the person associated with the mobile electronic device; and
            the IMEI of the mobile electronic device;
      acquire a fingerprint of a user of the mobile electronic device by way of the fingerprint scanner;
      determine a time and date of the acquisition of the fingerprint of the user by way of the fingerprint scanner;
      determine a location of the mobile electronic device at the time of the acquisition of the fingerprint of the user by way of the fingerprint scanner;
      compare characteristics of the fingerprint of the user acquired to the characteristics of the fingerprint of the person associated with the mobile electronic device stored in the memory of the mobile electronic device to determine whether the user is the person associated with the mobile electronic device; and
      in response to determining that the user is the person associated with the mobile electronic device, send to the attendance server, attendance data comprising:
         the IMEI of the mobile electronic device;
         the time and date of the acquisition of the fingerprint of the user by way of the fingerprint scanner; and
         the location of the mobile electronic device at the time of the acquisition of the fingerprint of the user by way of the fingerprint scanner, and
   the attendance server configured to:
      generate, using the personal identifier of the person associated with the mobile electronic device and the IMEI of the mobile electronic device of the registration data, a mapping of the IMEI of the mobile electronic device to the personal identifier of the person associated with the mobile electronic device in the device mapping;
      in response to receiving the attendance data:
         determine the personal identifier of the person associated with the mobile electronic device based on the mapping of the IMEI of the mobile electronic device to the personal identifier of the person associated with the mobile electronic device in the device mapping; and
         generate, in the attendance record, an attendance event associating the person associated with the mobile electronic device with at an event associated with the time and date of the acquisition of the fingerprint of the user by way of the fingerprint scanner and the location of the mobile electronic device at the time of the acquisition of the fingerprint of the user by way of the fingerprint scanner, to document attendance of the person associated with the mobile electronic device at the event.

2. The system of claim 1, the mobile electronic device further comprising attendance region data defining geographic extents of an attendance region associated with the event stored in a memory of the mobile electronic device, wherein the mobile electronic device is further configured to determine whether the mobile electronic device is located in the attendance region associated with the event, and wherein the acquisition of the fingerprint of the user of the mobile electronic device by way of the fingerprint scanner is performed in response to determining that the mobile electronic device is located in the attendance region associated with the event.

3. The system of claim 2, wherein the mobile electronic device is further configured to, in response to determining that the mobile electronic device is located in the attendance region associated with the event, prompt the user of the mobile electronic device to submit the fingerprint by way of the fingerprint scanner.

4. The system of claim 2, wherein the mobile electronic device is further configured to, in response to determining that the mobile electronic device is located outside of the attendance region associated with the event, send, to the attendance server, follow-up attendance data comprising a time at which the mobile electronic device is determined to have exited the attendance region associated with the event.

5. The system of claim 1, wherein the attendance server configured to, send to the mobile electronic device, acknowledgement data indicative of the recording of the attendance event, and wherein the mobile electronic device is further configured to store the acknowledgement data in an attendance log stored in the memory of the mobile electronic device.

6. The system of claim 1, wherein the mobile electronic device comprises a cellular mobile phone.

7. The system of claim 1, further comprising a wireless network, wherein the mobile electronic device and the attendance server communicate by way of the wireless network.

8. A method of attendance verification comprising:
  conducting, by a mobile electronic device, a registration operation comprising:
    acquiring, by the mobile electronic device, a fingerprint of a person associated with the mobile electronic device;
    storing, in a memory of the mobile electronic device, characteristics of the fingerprint of the person associated with the mobile electronic device; and
    sending, by the mobile electronic device to an attendance server, registration data comprising:
      a personal identifier of the person associated with the mobile electronic device; and
      an international mobile equipment identity (IMEI) of the mobile electronic device;
  generating, by the attendance server using the personal identifier of the person associated with the mobile electronic device and the IMEI of the mobile electronic device of the registration data, a mapping of the IMEI of the mobile electronic device to the personal identifier of the person associated with the mobile electronic device in a device mapping, the device mapping comprising a mapping of international mobile equipment identities (IMEIs) to respective personal identifiers, the attendance server comprising:
    the device mapping; and
    an attendance record comprising a listing of attendance events documenting attendance of persons at events;
  acquiring, by the mobile electronic device, a fingerprint of a user of the mobile electronic device by way of a fingerprint scanner, the a mobile electronic device comprising:
    the memory,
      the IMEI of the mobile electronic device stored in the memory of the mobile electronic device, and
      the characteristics of the fingerprint of the person associated with the mobile electronic device stored in the memory of the mobile electronic device; and
    the fingerprint scanner;
  determining, by the mobile electronic device, a time and date of the acquisition of the fingerprint of the user by way of the fingerprint scanner;
  determining, by the mobile electronic device, a location of the mobile electronic device at the time of the acquisition of the fingerprint of the user by way of the fingerprint scanner;
  comparing, by the mobile electronic device, characteristics of the fingerprint of the user acquired to the characteristics of the fingerprint of the person associated with the mobile electronic device stored in the memory of the mobile electronic device to determine whether the user is the person associated with the mobile electronic device;
  in response to the mobile electronic device determining that the user is the person associated with the mobile electronic device, sending, by the mobile electronic device to the attendance server, attendance data comprising:
    the IMEI of the mobile electronic device;
    the time and date of the acquisition of the fingerprint of the user by way of the fingerprint scanner; and
    the location of the mobile electronic device at the time of the acquisition of the fingerprint of the user by way of the fingerprint scanner; and
  in response to the attendance server receiving the attendance data:
    determining, by the attendance server, the personal identifier of the person associated with the mobile electronic device based on the mapping of the IMEI of the mobile electronic device to the personal identifier of the person associated with the mobile electronic device in the device mapping; and
    generating, by the attendance server, in the attendance record, an attendance event associating the person associated with the mobile electronic device with at an event associated with the time and date of the acquisition of the fingerprint of the user by way of the fingerprint scanner and the location of the mobile electronic device at the time of the acquisition of the fingerprint of the user by way of the fingerprint scanner, to document attendance of the person associated with the mobile electronic device at the event.

9. The method of claim 8, the mobile electronic device further comprising attendance region data defining geographic extents of an attendance region associated with the event stored in a memory of the mobile electronic device, the method further comprising determining, by the mobile electronic device, whether the mobile electronic device is located in the attendance region associated with the event, and the acquisition of the fingerprint of the user of the mobile electronic device by way of the fingerprint scanner is performed in response to determining that the mobile electronic device is located in the attendance region associated with the event.

10. The method of claim 9, further comprising, in response to the mobile electronic device determining that the mobile electronic device is located in the attendance region associated with the event, prompting, by the mobile electronic device, the user of the mobile electronic device to submit the fingerprint by way of the fingerprint scanner.

11. The method of claim 9, further comprising, in response to the mobile electronic device determining that the mobile electronic device is located outside of the attendance region associated with the event, sending, by the mobile electronic device to the attendance server, follow-up attendance data comprising a time at which the mobile electronic device is determined to have exited the attendance region associated with the event.

12. The method of claim 8, further comprising:
  sending, by the attendance server to the mobile electronic device, acknowledgement data indicative of the recording of the attendance event; and storing, by the mobile electronic device the acknowledgement data in an attendance log stored in the memory of the mobile electronic device.

13. The method of claim 8, wherein the mobile electronic device comprises a cellular mobile phone.

14. The method of claim 8, wherein the mobile electronic device and the attendance server communicate by way of a wireless network.

15. A non-transitory computer-readable storage medium comprising program instructions stored thereon that are executable by a processor to cause the following operations:
 conducting, by a mobile electronic device, a registration operation comprising:
  acquiring, by the mobile electronic device, a fingerprint of a person associated with the mobile electronic device;
  storing, in a memory of the mobile electronic device, characteristics of the fingerprint of the person associated with the mobile electronic device; and
  sending, by the mobile electronic device to an attendance server, registration data comprising:
   a personal identifier of the person associated with the mobile electronic device; and
   an international mobile equipment identity (IMEI) of the mobile electronic device;
 generating, by the attendance server using the personal identifier of the person associated with the mobile electronic device and the IMEI of the mobile electronic device of the registration data, a mapping of the IMEI of the mobile electronic device to the personal identifier of the person associated with the mobile electronic device in a device mapping, the device mapping comprising a mapping of international mobile equipment identities (IMEIs) to respective personal identifiers, the attendance server comprising:
  the device mapping; and
  an attendance record comprising a listing of attendance events documenting attendance of persons at events;
 acquiring, by the mobile electronic device, a fingerprint of a user of the mobile electronic device by way of a fingerprint scanner, the a mobile electronic device comprising:
  the memory,
   the IMEI of the mobile electronic device stored in the memory of the mobile electronic device, and
   the characteristics of the fingerprint of the person associated with the mobile electronic device stored in the memory of the mobile electronic device; and
  the fingerprint scanner;
 determining, by the mobile electronic device, a time and date of the acquisition of the fingerprint of the user by way of the fingerprint scanner;
 determining, by the mobile electronic device, a location of the mobile electronic device at the time of the acquisition of the fingerprint of the user by way of the fingerprint scanner;
 comparing, by the mobile electronic device, characteristics of the fingerprint of the user acquired to the characteristics of the fingerprint of the person associated with the mobile electronic device stored in the memory of the mobile electronic device to determine whether the user is the person associated with the mobile electronic device;
 in response to the mobile electronic device determining that the user is the person associated with the mobile electronic device, sending, by the mobile electronic device to the attendance server, attendance data comprising:
  the IMEI of the mobile electronic device;
  the time and date of the acquisition of the fingerprint of the user by way of the fingerprint scanner; and
  the location of the mobile electronic device at the time of the acquisition of the fingerprint of the user by way of the fingerprint scanner; and
 in response to the attendance server receiving the attendance data:
  determining, by the attendance server, the personal identifier of the person associated with the mobile electronic device based on the mapping of the IMEI of the mobile electronic device to the personal identifier of the person associated with the mobile electronic device in the device mapping; and
  generating, by the attendance server, in the attendance record, an attendance event associating the person associated with the mobile electronic device with at an event associated with the time and date of the acquisition of the fingerprint of the user by way of the fingerprint scanner and the location of the mobile electronic device at the time of the acquisition of the fingerprint of the user by way of the fingerprint scanner, to document attendance of the person associated with the mobile electronic device at the event.

16. The medium of claim 15, the mobile electronic device further comprising attendance region data defining geographic extents of an attendance region associated with the event stored in a memory of the mobile electronic device, the operations further comprising determining, by the mobile electronic device, whether the mobile electronic device is located in the attendance region associated with the event, and the acquisition of the fingerprint of the user of the mobile electronic device by way of the fingerprint scanner is performed in response to determining that the mobile electronic device is located in the attendance region associated with the event.

17. The medium of claim 16, the operations further comprising, in response to the mobile electronic device determining that the mobile electronic device is located in the attendance region associated with the event, prompting, by the mobile electronic device, the user of the mobile electronic device to submit the fingerprint by way of the fingerprint scanner.

18. The medium of claim 16, the operations further comprising, in response to the mobile electronic device determining that the mobile electronic device is located outside of the attendance region associated with the event, sending, by the mobile electronic device to the attendance server, follow-up attendance data comprising a time at which the mobile electronic device is determined to have exited the attendance region associated with the event.

19. The medium of claim 15, the operations further comprising:
 sending, by the attendance server to the mobile electronic device, acknowledgement data indicative of the recording of the attendance event; and
 storing, by the mobile electronic device the acknowledgement data in an attendance log stored in the memory of the mobile electronic device.

* * * * *